United States Patent Office 3,515,724
Patented June 2, 1970

3,515,724
PROCESS FOR THE PREPARATION OF SUBSTITUTED 4-PHENYL OR 4-PYRIDYL-1,2-DIHYDROQUINAZOLINE COMPOUNDS AND NOVEL SUBSTITUTED 4 - PYRIDYL-1,2-DIHYDROQUINAZOLINE PRODUCTS
George Francis Field, West Caldwell, and Leo Henryk Sternbach, Upper Montclair, N.J., assignors to Hoffmann-La Roche Inc., Nutley, N.J., a corporation of New Jersey
No Drawing. Filed Dec. 12, 1966, Ser. No. 600,742
Int. Cl. C07d 51/48
U.S. Cl. 260—251                    19 Claims

ABSTRACT OF THE DISCLOSURE

Substituted 4 - phenyl or 4 - pyridyl-1,2-dihydroquinazolines or the respective 3-oxides thereof are prepared by treating a correspondingly substituted 2-aminophenyl-aryl ketone with a substituted imine or hydroxylimine. The product dihydroquinazolines are useful as intermediates in the preparation of medicinally valuable 5-aryl-1,4-benzodiazepines.

---

This invention relates to a novel process for the preparation of pharmaceutically useful compounds. More particularly, the invention relates to a novel synthetic process for preparing 1,2-dihydroquinazolines of the formula:

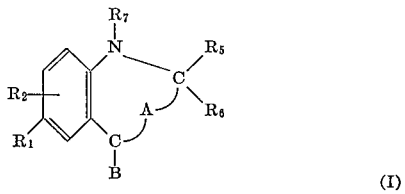

(I)

wherein $R_1$ and $R_2$ are each independently selected from the group consisting of hydrogen, halogen, lower alkyl, lower alkoxy, nitro, trifluoromethyl, cyano and lower alkylthio; $R_5$ is hydrogen, lower alkyl, halo-lower alkyl, di-halo-lower alkyl, tri-halo-lower alkyl, amino-lower alkyl, phenyl, phenyl-lower alkyl or aza-cyclo-lower alkyl-lower alkyl; $R_6$ is hydrogen, lower alkyl, halo-lower alkyl, di-halo-lower alkyl, tri-halo-lower alkyl, amino-lower alkyl or aza-cyclo-lower alkyl-lower alkyl, or when taken together, $R_5$ and $R_6$ are lower alkylene, aza-alkylene or N-lower alkyl-aza-lower alkylene; $R_7$ is hydrogen, lower alkyl, cyclo-lower alkyl or cyclo-lower alkyl-lower alkyl; A represents the group

or the group

and B is phenyl, substituted phenyl, pyridyl or substituted pyridyl.

As used herein, the term "lower alkyl" denotes both straight and branched chain saturated hydrocarbon groups having from 1 to 7 carbon atoms such as methyl, ethyl, propyl, isopropyl, butyl, isobutyl, and the like. The terms "halo," "halogen," "halide" etc., denote all four halogens, i.e., bromine, chlorine, fluorine, and iodine. The term "halo-lower alkyl" ocmprehends a lower alkyl group in which a hydrogen atom has been replaced by a halogen atom. Where more than one halogen atom is present, they can be the same or different halogens. When the group $R_1$, $R_2$, $R_5$ or $R_6$ denotes a halogen-containing group, then bromide or chlorine is preferred. When the group $R_5$ or $R_6$ denote halo-lower alkyl or di-halo-lower alkyl, the α-mono-halo-lower alkyls, the α,α-di-halo-lower alkyls and the α,α,α-tri-halo-lower alkyls such as α-mono-chloromethyl, α,α-di-chloromethyl, α,α,α-tri-chloromethyl, and the like are preferred. The term "amino-lower alkyl" denotes unsubstituted as well as mono- and di-substituted-amino-alkyl groups preferably mono-lower alkyl- and di-lower alkyl-aminoalkyl groups. The term "aza-cyclo-lower alkyl-lower alkyl" denotes saturated nitrogen-containing heterocyclic rings containings 5 to 6 ring atoms such as, for example, pyrrolidinyl or piperidyl. When $R_5$ and $R_6$, taken together, denote lower alkylene, there is comprehended a straight or branched chain hydrocarbon group which, together with the 2-position carbon atom in Formula I, defines a cycloalkyl moiety such as cyclopropyl, cyclopentyl, cyclohexyl, and the like. Similarly, when $R_5$ and $R_6$, taken together, denote aza-lower alkylene or N-lower alkyl-aza-lower alkylene, there is comprehended a moiety which, together with the 2-position carbon atom of compounds represented by Formula I, defines a saturated nitrogen-containing heterocyclic ring such as piperidine or such heterocyclic ring in which the hetero-nitrogen is substituted by a lower alkyl group. The term "substituted phenyl" denotes a phenyl group in which one of the hydrogen atoms has been replaced by a functional group such as halogen, lower alkyl, lower alkoxy, nitro, trifluoromethyl, cyano or lower alkylthio. The preferred substituted phenyl groups are the unsubstituted phenyl groups and those bearing a substituent in ortho-position. The phenyl and substituted phenyl groups of this invention can be represented structurally by the group:

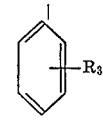

wherein $R_3$ is hydrogen, halogen, lower alkyl, lower alkoxy, nitro, trifluoromethyl, cyano or lower alkylthio. The terms "pyridyl" and "substituted pyridyl" denote the 2-, 3- and 4-pyridyl groups (2-pyridyl is preferred) as well as such groups bearing a functional substituent which may be halogen, lower alkyl, lower alkoxy, nitro, trifluoromethyl, cyano or lower alkylthio, i.e., groups of the formula:

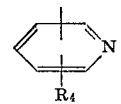

wherein $R_4$ is hydrogen, halogen, lower alkyl, lower alkoxy, nitro, trifluoromethyl, cyano or lower alkylthio.

Compounds of Formula I are prepared according to the novel process of this invention by treating a 2-aminophenyl-aryl ketone of the formula:

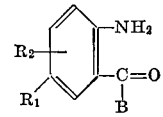

(II)

wherein $R_1$, $R_2$ and B have the same meaning as hereinabove with an imine of the formula:

(III)

wherein $R_5$ and $R_6$ have the same meaning as hereinabove and X is imino or hydroxylimino and preferably in the presence of an acid.

In still a more specific embodiment this invention in its process aspect relates to the preparation of compounds of the formulae:

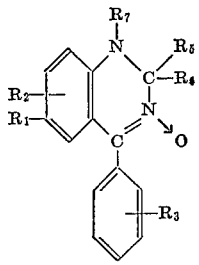

(I-a)

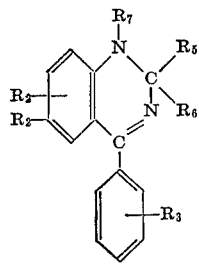

(I-b)

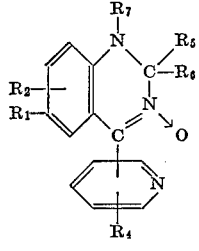

(I-c)

and

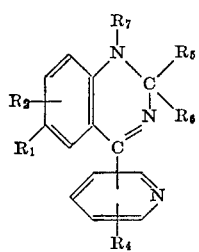

(I-d)

wherein $R_1$ through $R_6$ all have the same meaning as above; and $R_7$ is hydrogen, lower alkyl, cyclo-lower alkyl or cyclo-lower alkyl-lower alkyl.

Compounds of Formulae I–a and I–b above have been previously prepared by an alternative procedure. Compounds of Formulae I–c and I–d, however, have not been prepared by any previously known methods and are thus novel compounds which also constitute a part of this invention.

Accordingly, this invention in its product aspect relates to novel pyridylquinazoline derivatives of the formula:

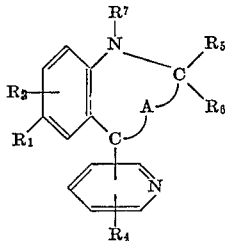

(IV)

wherein $R_1$, $R_2$, $R_4$, $R_5$, $R_6$, $R_7$ and A have the same meaning as hereinabove and pharmaceutically acceptable acid addition salts thereof.

The N-oxides of Formulae I–a and I–c can be readily prepared in a single-step reaction by treating a 2-amino- benzophenone or a 2-aminobenzoylpyridine of Formula II with (a) hydroxylamine, a salt thereof or hydroxylamine together with an equimolar amount or molar excess of an acid and (b) a member selected from the group consisting of ketones and aldehydes of the formula:

(V)

wherein $R_5$ and $R_6$ have the same meaning as hereinabove and acetals of the formula:

(VI)

wherein $R_5$ and $R_6$ have the same meaning as hereinabove and $R_{11}$ and $R_{12}$ are each independently lower alkyl or benzyl or, taken together, $R_{11}$ and $R_{12}$ are lower alkylene.

In carrying out this reaction, it is preferred to employ the hydroxylamine reactant in the form of an acid salt. Any of the usual organic or inorganic acid salts can be suitably employed in the reaction though it is preferred to utilize the salt of a strong acid such as the salt of a mineral acid, e.g., sulfuric acid, hydrohalic acids such as hydrochloric acid, and the like, or a strong organic acid such as trichloroacetic acid, trifluoroacetic acid, and the like. The reaction can, however, be carried out with hydroxylamine in the presence or absence of an acid. When an acid is utilized, the amount will vary with the particular acid employed though ordinarily a molar amount based upon the amount of hydroxylamine is sufficient. Any of the usual acids preferably a strong organic or inorganic acid can be employed and of course the acid can be added as the hydroxylamine salt, e.g., hydroxylamine hydrochloride, hydroxylamine sulfate, hydroxylamine phosphate, etc., as noted above with or without the addition of excess acid. When an aldehyde of Formula V is used in the condensation, there can be employed either the monomeric aldehydes or polymeric aldehydes such as paraformaldehyde, polymeric dichloroacetaldehyde, and the like. The reaction is conveniently carried out at room temperature though higher or lower temperatures can also be employed. As a practical matter, however, the reaction will ordinarily be carried out between about 50° C. and 150° C. The reaction can be carried out in an aqueous medium or in an inert organic solvent. Organic solvents which can be suitably employed are the alcohols such as methanol, ethanol, propanol, and the like; ethers such as dioxane, tetrahydrofuran etc.; hydrocarbons such as benzene, toluene, etc., and others.

Compounds of Formulae I–b and I–d can be prepared by reduction of the corresponding N-oxides of Formulae I–a and I–c, respectively. The reduction is readily accomplished by treating the appropriate N-oxide with phosphorous trihalide, e.g., phosphorus trichloride, phosphorous tribromide, etc., with hydrogen in the presence of a hydrogenation catalyst such as Raney nickel.

Alternatively, the compounds of Formulae I–b and I–d can be obtained directly by treating a 2-aminobenzophenone or a 2-aminobenzoylpyridine of Formula II with (a) ammonia or an ammonium salt, and, if desired, in the presence of an acid catalyst; and (b) a member selected from the group consisting of aldehydes and ketones of Formula V and acetals of Formula VI. Suitable ammonium salts are the salts with weak acids such as ammonium acetate, dihydrophosphate, and the like. Where acid is employed with ammonia or an ammonium salt, there can be utilized any of the ordinary organic or inorganic acids, preferably a weak acid such as acetic acid, and the like. The amount of acid employed will vary with the particular acid selected though ordinarily it is desired to utilize about an equimolar amount of acid or a molar excess of acid based upon the amount of 2-aminophenylaryl ketone. The acid can, of course, be added in the form of the ammonium salt. In such instances, an excess of acid can also be added if desired. Where an aldehyde is employed in the condensation, there can be utilized either the monomeric or the polymeric aldehydes as the condensation with ammonia or a salt thereof is suitably carried out at a temperature between about room temperature and the boiling point of the reaction mixture, preferably between about 50° C. and about 150° C. The reaction is conveniently carried out in either an aqueous medium of in the presence of an inert organic solvent such as alkanols, ethers, hydrocarbon solvents, and the like.

Alternatively, the compounds of Formulae I–a and I–b, as well as the novel compounds of Formulae I–c and I–d, can be prepared, as noted above, by condensing an oxime (in the case of compounds of Formulae I–a and I–c) of the formula:

(III-a)

wherein $R_5$ and $R_6$ have the same meaning as above i.e., a compound of Formula III wherein X is hydroxylamine, or a Schiff's base (in the case of compounds of Formulae I–b and I–d) of the formula:

(III-b)

wherein $R_5$ and $R_6$ have the same meaning as above i.e., a compound of Formula III wherein X is imino, with a 2-aminophenyl ketone of Formula II and preferably in the presence of an acid. The oximes of Formula III–a and the Schiff's base of Formula III–b are known starting materials or analogs of known starting materials, the preparation of which will be readily apparent to those skilled in the art.

Suitable acids preferably employed in effecting the condensation are the weak organic acids in the case of the Schiff's base condensation and the strong mineral acids in the case of the oxime condensation. The reaction is preferably carried out at room temperature though higher or lower temperatures could also be employed, suitably a temperature between about 0° C. and 150° C. The reaction can be carried out in an organic solvent, or if desired, in an aqueous medium. Suitable solvents are, for example, the alcohols such as methanol, ethanol, propanol, etc.; hydrocarbon solvents such as benzene, toluene, etc.; ethers such as dioxane, tetrahydrofuran, and the like.

In preparing the quinazoline derivatives of this invention according to the processes described above, there are obtained compounds of Formula I wherein $R_7$ is hydrogen. Compounds of Formula I wherein $R_7$ is other than hydrogen, i.e., lower alkyl, cyclo-lower alkyl, cyclo-lower alkyl-lower alkyl, are prepared from compounds of Formula I wherein $R_7$ is hydrogen by the usual techniques for alkylation. For example, a compound of Formula I wherein $R_7$ is hydrogen can be alkylated by reaction with a lower alkyl halide (preferably a bromide or iodide) in the presence of a strong base such as potassium or sodium lower alkoxide or hydride. Other alkylating agents such as, for example, di-lower alkyl sulfates can also be employed.

The 4-phenylquinazoline derivatives of Formulae I–a and I–b are, as previously noted, pharmaceutically useful compounds. They are, for example, useful as anti-convulsants and as anorectic agents. The novel 4 - pyridylquinazoline derivatives of this invention, i.e., the compounds of Formula IV and pharmaceutically acceptable salts thereof, are useful as analgesic agents. More particularly, they are useful as anti-inflammatory agents.

Compounds of Formula IV which, as set forth above, are pharmaceutically useful compounds can be administered internally, for example, orally or parenterally, with dosage adjusted to individual requirements. For purposes of administration, they can be placed in conventional solid or liquid pharmaceutical administration forms and can be combined with conventional pharmaceutical solid or liquid carriers. For example, said compounds of Formula IV or pharmaceutically acceptable acid addition salts thereof can be administered in conventional pharmaceutical administration forms such as dispersions, capsules, emulsions, suspensions, tablets, or the like, and can be combined with conventional pharmaceutical carriers or excipients such as cornstarch, lactose, or the like.

The compounds of Formula IV form acid addition salts. For example, they form pharmaceutically acceptable acid addition salts with pharmaceutically acceptable organic or inorganic acids such as acetic acid, succinic acid, methanesulfonic acid, paratoluenesulfonic acid, maleic acid, hydrochloric acid, hydrobromic acid, phosphoric acid, sulfuric acid, or the like. Acid addition salts of compounds of Formula IV which are not pharmaceutically acceptable can be converted into either the free base or into pharmaceutically acceptable acid addition salts by conventional techniques, for example, by neutralization and then, if desired, by reaction with a pharmaceutically acceptable acid.

In addition to their pharmaceutical utility the compounds of Formula I are also useful as intermediates in the preparation of known pharmaceutically useful benzodiazepine derivatives. The compounds of Formula I can, for instance, be converted to benzodiazepines and benzodiazepine N-oxides by known procedures via ring expansion upon treatment with base. For example, a 1,2-dihydroquinazoline of Formula I, e.g., 6-chloro-2-dichloromethyl-1,2-dihydro-4-phenylquinazoline 3-oxide, when treated with ammonia or a primary amine, e.g., a lower alkylamine, gives a corresponding benzodiazepine N-oxide, e.g., 7 - chloro - 2 - methylamino - 5 - phenyl-3H-1,4-benzodiazepine 4-oxide. Compounds of Formula I are also useful as intermediates in the preparation of β-oximes of 2-aminobenzophenones and of 2-aminobenzoylpyridines. Said β-oximes are a valuable class of starting materials useful in the preparation of known 5-pyridyl- and 5 - phenyl - 1,3 - dihydro - 2H - 1,4-benzodiazepin-2-one 4-oxides. The β-oximes are prepared by cleaving a compound of Formula I by acid hydrolysis.

This invention will be more fully understood from the detailed examples which follow. These examples are merely to illustrate the invention.

EXAMPLE 1

Preparation of 6-chloro-2-dichloromethyl-1,2-dihydro-4-phenylquinazoline 3-oxide A two liter round-bottom reaction flask, provided with stirrer, dropping funnel and a drying tube was charged with 46.3 g. of 2-amino-5-chlorobenzophenone (0.2 mol), 400 ml. of ethanol, 32.8 g. of hydroxylamine sulfate (0.2 mol) and 27.2 g. of distilled dichloroacetaldehyde (0.24 mol). The reaction mixture was stirred vigorously for 17 hours at room temperature, and 200 ml. of 10% sodium carbonate aqueous solution were added over a five minute period. After the addition of the alkali was completed, the batch was stirred for an additional ten minutes. The resulting yellow precipitate was filtered off and the filter cake washed with 300 ml. of cold water. After sucking the water washed cake as dry as possible, the moist filter cake was rewashed with 300 ml. of cold ethanol. The yellow product was dried to constant weight at 85° C. under vacuum (ca. 10 in. Hg). The 6-chloro-2 - dichloromethyl - 1,2 - dihydro - 4 - phenylquinazoline 3-oxide product so obtained melted at 198–201° C.

EXAMPLE 2

Preparation of 6-chloro-2-dichloromethyl-1,2-dihydro-4-phenylquinazoline 3-oxide A mixture of 23.2 g. (100 mmoles) of 2-amino-5-chlorobenzophenone, 22.5 g. (120 mmoles) of dichloroacetaldehyde diethylacetal; 16.4 g. (100 mmoles) of hydroxylamine sulfate and 200 ml. of ethanol was stirred at room temperature for 24 hours. Addition of 100 ml. of 10% aqueous sodium carbonate solution gave a gummy precipitate. The precipitate was extracted four times

EXAMPLE 3

Preparation of 6-chloro-2-chloromethyl-1,2-dihydro-4-phenylquinazoline 3-oxide

A mixture of 20.0 g. (160 mmoles) of chloroacetaldehyde dimethylacetal and 20.0 ml. (30 mmoles) of 1.5 N aqueous hydrochloric acid was heated under reflux for 15 minutes. This solution was added to a mixture of 23.2 g. (100 mmoles) of 2-amino-5-chlorobenzophenone, 8.2 g. (50 mmoles) of hydroxylamine sulfate and 150 ml. of ethanol. The reaction mixture was stirred for 50 minutes at room temperature and then treated with 100 ml. of 10% aqueous sodium carbonate solution to give yellow solids. The yellow solids were washed with 150 ml. of water and dried at 90° C. in a vacuum oven (ca. 10 in. Hg). The yellow prisms so obtained melted at 164–7° C.

EXAMPLE 4

Preparation of 6-chloro-1,2-dihydro-2,2-dimethyl-4-phenylquinazoline 3-oxide

A solution of 23.1 g. (100 mmoles) of 2-amino-5-chlorobenzophenone, 8.8 g. (120 mmoles) acetone oxime, 7.0 ml. (50 mmoles) of 7.2 N hydrochloric acid in ethanol and 200 ml. of ethanol was heated under reflux for 18 hours. The solution was cooled to room temperature, neutralized with a calculated amount of 10% aqueous $Na_2CO_3$ solution, diluted with an equal volume of water and extracted three times with $CH_2Cl_2$. The $CH_2Cl_2$ extracts were combined, dried over $Na_2SO_4$, filtered and concentrated to dryness. The amber oil so obtained, was taken up in $CH_2Cl_2$ and passed over alumina (neutral grade I). After eluting with 2.0 l. of $CH_2Cl_2$, the eluates were concentrated in vacuo giving 6-chloro-1,2-dihydro-2,2-dimethyl-4-phenylquinazoline 3-oxide as yellow solids melting at 185–205°. After two recrystallizations from $CH_2Cl_2$/acetone, the product was obtained as yellow rods melting at 220–225° C.

EXAMPLE 5

Preparation of 4-(2-fluorophenyl)-1,2-dihydro-6-nitroquinazoline 3-oxide

A mixture of 4.35 g. (62.5 mmoles) of hydroxylamine hydrochloride, 1.88 g. (62.5 mmoles) of paraformaldehyde and 30 ml. of pyridine was heated on the steam bath until a clear solution was obtained. To this solution was added 13 g. (50 mmoles) of 2-amino-2'-fluoro-5-nitrobenzophenone and the mixture was allowed to stand at room temperature for 4 days. The precipitate obtained upon dilution with water to 125 ml. was recrystallized from tetrahydrofuran/ether to give 4-(2-fluorophenyl)-1,2-dihydro-6-nitroquinazoline 3-oxide as yellow prisms, M.P. 211–214°.

EXAMPLE 6

Preparation of 6-bromo-1,2-dihydro-4-(4-methylphenyl)-quinazoline 3-oxide

A mixture of 0.9 g. (30 mmoles) of para-formaldehyde, 2.08 g. (30 mmoles) of hydroxylamine hydrochloride and 25 ml. of pyridine was heated on the steam bath until a clear solution was obtained. To this solution was added 7.25 g. (25 mmoles) of 2-amino-5-bromo-4'-methylbenzophenone, and the reaction mixture was allowed to stand at room temperature for 18 hours. The product was precipitated by addition of 150 ml. of water, collected and washed with ether to give 6-bromo-1,2-dihydro-4-(4-methylphenyl)quinazoline 3-oxide, M.P. 155–158° (dec.). Recrystallization from ethanol gave yellow needles, M.P. 169–172°.

EXAMPLE 7

Preparation of 6-chloro-1,2-dihydro-4-(4-chlorophenyl)-quinazoline 3-oxide

A mixture of 4.35 g. (62.5 mmoles) of hydroxylamine hydrochloride, 1.88 g. (62.5 mmoles) of paraformaldehyde and 30 ml. of pyridine was heated on the steam bath until a clear solution was obtained.. To this solution was added 13.3 g. (50 mmoles) of 2-amino-5,4'-dichlorobenzophenone, and the reaction mixture was allowed to stand for 18 hours at room temperature. Dilution with 175 ml. of water gave a precipitate melting at 120–125° (dec.) which was recrystallized from ethyl acetate to give 6-chloro-1,2-dihydro-4-(4-chlorophenyl)quinazoline 3 - oxide, M.P. 160–163°. Recrystallization from ethanol gave yellow needles, M.P. 162–165°.

EXAMPLE 8

Preparation of 6-chloro-1,2-dihydro-4-(2-fluorophenyl)-quinazoline 3-oxide

A mixture of 1.88 g. (63 mmoles) of para-formaldehyde and 4.35 g. (63 mmoles) of hydroxylamine hydrochloride was dissolved in 100 ml. of hot ethanol. To this solution was added 12.6 g. (50 mmoles) of 2-amino-5-chloro-2'-fluorobenzophenone and the solution was allowed to stand overnight at room temperature. The solution was made basic with 10% sodium bicarbonate solution, diluted to 300 ml. with water and extracted with 400 ml. of methylene chloride in two portions. The combined methylene chloride extracts were washed with water, dried over sodium sulfate and concentrated in vacuo (30 mm. Hg). The residue was crystallized from ether to give 6-chloro-1,2-dihydro-4-(2-fluorophenyl)quinazoline 3-oxide. Recrystallization from ethyl acetate/hexane gave the product as yellow needles, M.P. 149–152°.

EXAMPLE 9

Preparation of 1,2-dihydro-6-methyl-4-phenylquinazoline 3-oxide

A mixture of 1.5 g. (50 mmoles) of para-formaldehyde and 3.45 g. (50 mmoles) of hydroxylamine hydrochloride was dissolved in 50 ml. of ethanol. To this solution was added 10.55 g. (50 mmoles) of 2-amino-5-methylbenzophenone, and the solution was allowed to stand at room temperature for 18 hours. The reaction mixture was neutralized by addition of 10% sodium carbonate solution and concentrated in vacuo. The residue was dissolved in 250 ml. of methylene chloride and was washed with water and brine. The methylene chloride solution was dried over sodium sulfate and concentrated in vacuo (30 mm. Hg). The residue was crystallized from ether to give 1,2-dihydro-6-methyl-4-phenylquinazoline 3-oxide, M.P. 140–147°. Recrystallization from chloroform/hexane gave yellow plates, M.P. 157–160°.

EXAMPLE 10

Preparation of 6-chloro-4-(2-chlorophenyl)-1,2-dihydroquinazoline 3-oxide

A mixture of 2.08 g. (30 mmoles) of hydroxylamine hydrochloride, 0.9 g. (30 mmoles) of para-formaldehyde and 25 ml. of pyridine was heated on the steam bath until a clear solution was obtained. To this mixture was added 6.66 g. (25 mmoles) of 2-amino-2',5-dichlorobenzophenone, and the solution was allowed to stand at room temperature for 18 hours. The reaction mixture was concentrated to a thick oil in vacuo (30 mm. Hg) and 6-chloro-4-(2-chlorophenyl)-1,2-dihydroquinazoline 3 - oxide, M.P. 168–175° was collected from a mixture of water and ether. Recrystallization from ethanol gave yellow prisms, M.P. 188–190°.

EXAMPLE 11

Preparation of 6,8-dibromo-1,2-dihydro-4-(2-pyridyl) quinazoline 3-oxide

A mixture of 4.35 g. (63 mmoles) of hydroxylamine hydrochloride, 1.88 g. (63 mmoles) of para-formaldehyde and 40 ml. of pyridine was heated on the steam bath until a clear solution was obtained. To this mixture was added 17.8 g. (50 mmoles) of 2-(2-amino-3,5-dibromobenzoyl) pyridine, and the solution was allowed to stand at room temperature for 18 hours. Dilution of the reaction mixture with 200 ml. of water precipitated 6,8-dibromo-1,2-dihydro-4-(2-pyridyl)quinazoline 3-oxide, M.P. 190–193°. Recrystallization from tetrahydrofuran/hexane gave yellow needles, M.P. 217–219°.

EXAMPLE 12

Preparation of 6-chloro-1,2-dihydro-4-phenylquinazoline

A mixture of 11.6 g. (50 mmoles) of 2-amino-5-chlorobenzophenone, 2.25 g. (75 mmoles) of paraformaldehyde, 10 ml. of glacial acetic acid and 250 ml. of 9.4% of ethanolic ammonia was heated under reflux for 17 hours. The reaction mixture was cooled, diluted with 600 ml. of 10% sodium bicarbonate solution and extracted with 3× 200 ml. of methylene chloride. The methylene chloride extracts were combined, washed with 250 ml. of water, washed with 250 ml. of brine and dried over sodium sulfate. The residue left on evaporation of the methylene chloride in vacuo was crystallized from petroleum ether and from cyclohexane to give 6-chloro-1,2-dihydro-4-phenylquinazoline, M.P. 145–151°.

EXAMPLE 13

Preparation of 1,2-dihydro-4-phenylquinazoline

A mixture of 9.85 g. (50 mmoles) of 2-aminobenzophenone, 2.25 g. (75 mmoles) of paraformaldehyde, 10 ml. of glacial acetic acid and 250 ml. of 9% ethanolic ammonia was heated under reflux for 18 hours. The reaction mixture was cooled, diluted to 500 ml. with 10% sodium bicarbonate solution and extracted with methylene chloride. The methylene chloride extracts were washed with water, dried over sodium sulfate, and evaporated in vacuo. The residue was crystallized from hexane and recrystallized from ethyl acetate to give yellow needles of 1,2-dihydro-4-phenylquinazoline, M.P. 162–165°.

EXAMPLE 14

Preparation of 1,2-dihydro-6-nitro-4-phenylquinazoline

A mixture of 12.1 g. (50 mmoles) of 2-amino-5-nitrobenzophenone, 2.25 g. (75 mmoles) of paraformaldehyde, 10 ml. of glacial acetic acid and 250 ml. of 9% ethanolic ammonia was heated under reflux for 17 hours. Addition of 10% sodium bicarbonate solution precipitated the product, M.P. 195–200° which was collected and washed with ether. Recrystallization from ethanol gave yellow needles of 1,2-dihydro-6-nitro-4-phenylquinazoline, melting at 205–208°.

EXAMPLE 15

Preparation of 7-chloro-2-methylamino-5-phenyl-3H-1,4-benzodiazepine 4-oxide from 6-chloro-2-dichloromethyl-1,2-dihydro-4-phenylquinazoline 3-oxide A solution of 3.4 g. (10 mmoles) of 6-chloro-2-dichloromethyl-1,2-dihydro-4-phenylquinazoline 3-oxide in 100 ml. of liquid methylamine was stirred under a Dry Ice condenser for 2.5 hours and then the methylamine was allowed to evaporate slowly overnight. The residue was dissolved in 200 ml. of methylene chloride, the solution washed with a mixture of 50 ml. of 10% sodium carbonate solution and 50 ml. of ice and the methylene chloride phase dried over sodium sulfate. The solvent was removed in vacuo to give a yellow oil from which on addition of ether there was obtained 7-chloro-2-methylamino-5-phenyl-3H-1,4-benzodiazepine 4-oxide, M.P. 220–230° (sinters 190°). Recrystallization from about 15 ml. of ethanol gave the pure product.

EXAMPLE 16

This example illustrates typical pharmaceutical formulations containing 6,8-dibromo-1,2-dihydro-4-(2-pyridyl) quinazoline 3-oxide, an exemplar of the novel compounds disclosed herein.

(a) Suppository formulation

| | Per 1.3 gram suppository, grams |
|---|---|
| 6,8 - dibromo - 1,2 - dihydro-4-(2-pyridyl)quinazoline 3-oxide | 0.025 |
| Wecobee M | 1.230 |
| Carnauba wax | 0.045 |

Procedure (1) The Wecobee M and the carnauba wax were melted in a suitable size glass lined container, mixed well and cooled to 45° C.

(2) 6,8 - dibromo - 1,2-dihydro-4-(2-pyridyl)quinazoline 3-oxide, which had been reduced to a fine powder with no lumps, was stirred until completely and uniformly dispersed.

(3) The mixture was poured into suppository molds to yield suppositories having an individual weight of 1.3 grams.

(4) The suppositories were cooled and removed from molds. They were then individually wrapped in wax paper for packaging.

(b) Tablet formulation

| | Per tablet, mg. |
|---|---|
| 6,8 - dibromo - 1,2 - dihydro-4-(2-pyridyl)quinazoline 3-oxide | 25.00 |
| Lactose, U.S.P. | 64.50 |
| Cornstarch | 10.00 |
| Magnesium stearate | 0.50 |

Procedure (1) 6,8-dibromo - 1,2 - dihydro-4-(2-pyridyl)quinazoline-3-oxide was mixed with the lactose, cornstarch and magnesium stearate in a suitable mixer.

(2) The mixture was further blended by passing through a Fitzpatrick comminuting machine fitted with a No. 1-A screen with knives forward.

(3) The mixed powders were slugged on a tablet compressing machine.

(4) The slugs were comminuted to a suitable mesh size (No. 16 screen) and mixed well.

(5) The tablets were compressed at a tablet weight of 100 mg. using tablet punches having a diameter of approximately ¼″. (Tablets may be either flat or biconvex and may be scored if desired.)

(c) Capsule formulation

| | Per capsule, mg. |
|---|---|
| 6,8-dibromo-1,2-dihydro - 4 - (2 - pyridyl)quinazoline 3-oxide | 50 |
| Lactose, U.S.P. | 125 |
| Cornstarch, U.S.P. | 30 |
| Talc, U.S.P. | 5 |
| Total weight | 210 |

Procedure (1) 6,8-dibromo - 1,2 - dihydro-4-(2-pyridyl)quinazoline 3-oxide was mixed with lactose and cornstarch in a suitable mixer.

(2) The mixture was further blended by passing through a Fitzpatrick comminuting machine with a No. 1-A screen with knives forward.

(3) The blended powder was returned to the mixer, the talc added and blended thoroughly.

(4) The mixture was filled into No. 4 hard shell gelatin capsules on a Parke-Davis capsulating machine.

(d) Parenteral formulation

| | Per cc. |
|---|---|
| 6,8 - dibromo - 1,2 - dihydro-4-(2-pyridyl)quinazoline 3-oxide | 2.5 mg. |
| Tartaric acid | Q.s. ad pH 3.0 |
| Phenol anhydrous | 4.5 mg. |
| Water for injection, U.S.P. | Q.s. ad 1.0 cc. |

Procedure (1) 6,8-dibromo-1,2-dihydro - 4 - (2-pyridyl)quinazoline 3-oxide was slurried in part of the water for injection.

(2) 6,8-dibromo - 1,2 - dihydro-4-(2-pyridyl)quinazoline 3-oxide was solubilized by slowly adding the tartaric acid to a pH of approximately 3.0.

(3) The phenol anhydrous was then added.

(4) The solution was filtered and allowed to stand for 24 hours. It was then filtered through an 0.2 Selas candle.

(5) The solution was filled into desired size ampuls and sealed under an atmosphere of nitrogen.

(6) All ampuls were inspected; those containing excessive amounts of fibers were rejected.

What is claimed is:

1. A process for the preparation of a compound of the formula

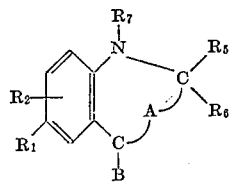

wherein $R_1$ and $R_2$ are each independently selected from the group consisting of hydrogen, halogen, lower alkyl, lower alkoxy, nitro, trifluoromethyl, and cyano; $R_5$ is hydrogen, lower alkyl halo-lower alkyl, di-halo-lower alkyl, tri-halo-lower alkyl, amino-lower alkyl or aza-cyclo-lower alkyl-lower alkyl; $R_6$ is hydrogen, lower alkyl, halo-lower alkyl, di-halo-lower alkyl, tri-halo-lower alkyl, amino-lower alkyl or aza-cyclo-lower alkyl-lower alkyl; or when taken together, $R_5$ and $R_6$ are lower alkylene, aza-alkylene or N-lower alkyl-aza-lower alkylene; $R_7$ is hydrogen, lower alkyl, cyclo-lower alkyl or cyclo-lower alkyl-lower alkyl; A represents the group

or the group

and B is phenyl, phenyl substituted with halogen, lower alkyl, nitro, or trifluoromethyl or pyridyl which comprises treating a 2-aminophenyl-aryl ketone of the formula

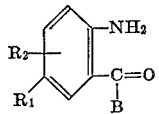

wherein $R_1$, $R_2$ and B have the same meaning as above with an imine of the formula:

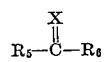

wherein $R_5$ and $R_6$ have the same meaning as above and X is imino or hydroxylimino and where $R_7$ is other than hydrogen, alkylating the product of the aforesaid reaction.

2. A process according to claim 1 for preparing a compound of the formula

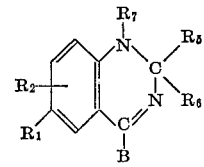

wherein $R_1$ and $R_2$ each are independently selected from the group consisting of hydrogen, halogen, lower alkyl, lower alkoxy, nitro, trifluoromethyl, and cyano; $R_5$ is hydrogen, lower alkyl halo-lower alkyl, di-halo-lower alkyl, tri-halo-lower alkyl, amino-lower alkyl or aza-cylo-lower alkyl-lower alkyl; $R_6$ is hydrogen, lower alkyl, halo-lower alkyl, di-halo-lower akyl, trihalo-lower alkyl, amino-lower alkyl or aza-cyclo-lower alkyl-lower alkyl; or when taken together, $R_5$ and $R_6$ are lower alkylene, aza-alkylene or N-lower alkyl-aza-lower alkylene; $R_7$ is hydrogen, lower alkyl, cyclo-lower alkyl or cyclo-lower alkyl-lower alkyl; and B is phenyl, phenyl substituted with halogen, lower alkyl, nitro, or trifluoromethyl, or pyridyl which comprises treating a 2-aminophenyl-aryl ketone of the formula:

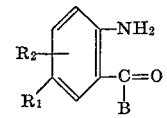

wherein $R_1$, $R_2$ and B have the same meaning as above with a Schiff's base of the formula:

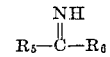

wherein $R_5$ and $R_6$ have the same meaning as above and X is imino or hydroxylimino and where $R_7$ is other than hydrogen, alkylating the product of the aforesaid reaction.

3. A process according to claim 1 for preparing a compound of the formula:

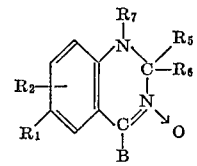

wherein $R_1$ and $R_2$ are each independently selected from the group consisting of hydrogen, halogen, lower alkyl, lower alkoxy, nitro, trifluoromethyl, and cyano; $R_5$ is hydrogen, lower alkyl, halo-lower alkyl, di-halo-lower alkyl, tri-halo-lower alkyl, amino-lower alkyl or aza-cyclo-lower alkyl-lower alkyl; $R_6$ is hydrogen, lower alkyl, halo-lower alkyl, di-halo-lower alkyl, tri-halo-lower alkyl, amino-lower alkyl, or aza-cyclo-lower alkyl-lower alkyl; or when taken together, $R_5$ and $R_6$ are lower alkylene, aza-alkylene or N-lower alkyl-aza-lower alkylene; $R_7$ is hydrogen, lower alkyl, cyclo-lower alkyl or cyclo-lower alkyl-lower alkyl; and B is phenyl, substituted with halogen, lower alkyl, nitro or trifluoromethyl, or pyridyl which comprises treating a 2-aminophenyl-aryl ketone of the formula:

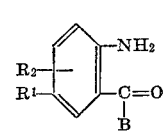

wherein $R_1$, $R_2$ and B have the same meaning as above with an oxime of the formula:

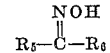

wherein $R_5$ and $R_6$ have the same meaning as above and where $R_7$ is other than hydrogen, alkylating the product of the aforesaid reaction.

4. A process for the preparation of a compound of the formula:

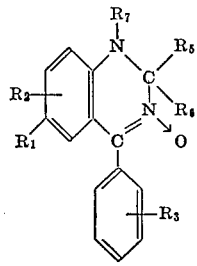

wherein $R_1$ and $R_2$ are each independently selected from the group consisting of hydrogen, halogen, lower alkyl, lower alkoxy, nitro, trifluoromethyl, and cyano; $R_3$ is hydrogen, halogen, lower alkyl, nitro, or trifluoromethyl; $R_5$ is hydrogen, lower alkyl, halo-lower alkyl, di-halo-lower alkyl, tri-halo-lower alkyl, amino-lower alkyl or aza-cyclo-lower alkyl-lower alkyl; $R_6$ is hydrogen, lower alkyl, halo-lower alkyl, di-halo-lower alkyl, tri-halo-lower alkyl, amino-lower alkyl or aza-cyclo-lower alkyl-lower alkyl; or when taken together, $R_5$ and $R_6$ are lower alkylene, aza-alkylene or N-lower alkyl-aza-lower alkylene; and $R_7$ is hydrogen, lower alkyl, cyclo-lower alkyl or cyclo-lower alkyl-lower alkyl which comprises treating a 2-aminobenzophenone of the formula:

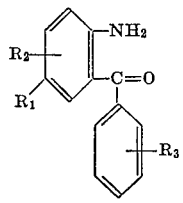

wherein $R_1$, $R_2$ and $R_3$ have the same meaning as above with hydroxylamine or a salt thereof and a member selected from the group consisting of ketones and aldehydes of the formula:

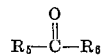

wherein $R_5$ and $R_6$ have the same meaning as above and acetals of the formula:

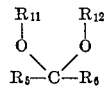

wherein $R_5$ and $R_6$ have the same meaning as above and $R_{11}$ and $R_{12}$ are each independently lower alkyl or benzyl or, taken together $R_{11}$ and $R_{12}$ are lower alkylene and where $R_7$ is other than hydrogen, alkylating the product of the aforesaid reaction.

5. A process according to claim 4 wherein the reaction is carried out in the presence of an acid of sufficient strength to form the salt of said hydroxylamine.

6. A process according to claim 4 for preparing 6-chloro - 2 - dichloromethyl-1,2-dihydro-4-phenylquinazoline 3-oxide which comprises treating 2-amino-5-chlorobenzophenone with hydroxylamine sulfate and dichloroacetaldehyde.

7. The process according to claim 6 wherein the dichloroacetaldehyde is polymeric dichloroacetaldehyde.

8. A process according to claim 4 for preparing 6-chloro - 2 - dichloromethyl-1,2-dihydro-4-phenylquinazoline 3-oxide which comprises treating 2-amino-5-chlorobenzophenone with hydroxylamine sulfate and dichloroacetaldehyde dialkyl acetal.

9. A process according to claim 4 for preparing 6-chloro - 2 - chloromethyl-1,2-dihydro-4-phenylquinazoline 3-oxide which comprises treating 2-amino-5-chlorobenzophenone with hydroxylamine sulfate and chloroacetaldehyde dialkyl acetal.

10. A process for the preparation of a compound of the formula.

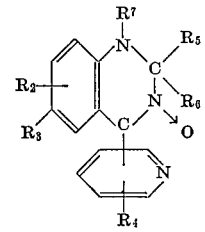

wherein $R_1$ and $R_2$ are each independently selected from the group consisting of hydrogen, halogen, lower alkyl, lower alkoxy, nitro, trifluoromethyl, and cyano; $R_4$ is hydrogen; $R_5$ is hydrogen lower alkyl, halo-lower alkyl, di-halo-lower alkyl, tri-halo-lower alkyl, amino-lower alkyl or aza-cyclo-lower alkyl-lower alkyl; $R_6$ is hydrogen, lower alkyl, halo-lower alkyl, di-halo-lower alkyl; tri-halo-lower alkyl, amino-lower alkyl or aza-cyclo-lower alkyl-lower alkyl, or when taken together, $R_5$ and $R_6$ are lower alkylene, aza-alkylene or N-lower alkyl-aza-lower alkylene; and $R_7$ is hydrogen, lower alkyl, cyclo-lower alkyl or cyclo-lower alkyl-lower alkyl which comprises treating a 2-aminobenzoylpyridine of the formula:

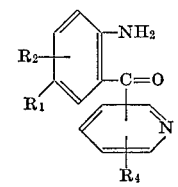

wherein $R_1$, $R_2$ and $R_4$ have the same meaning as above with hydroxylamine or a salt thereof and a member selected from the group consisting of ketones and aldehydes of the formula:

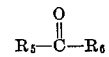

wherein $R_5$ and $R_6$ have the same meaning as above and acetals of the formula:

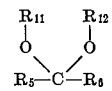

wherein $R_5$ and $R_6$ have the same meaning as above and $R_{11}$ and $R_{12}$ are each independently lower alkyl or benzyl or, taken together, $R_{11}$ and $R_{12}$ are lower alkylene and where $R_7$ is other than hydrogen, alkylating the product of the aforesaid reaction.

11. A process according to claim 10 wherein the reaction is carried out in the presence of an acid of sufficient strength to form the salt of said hydroxylamine.

12. A process for the preparation of a compound of the formula:

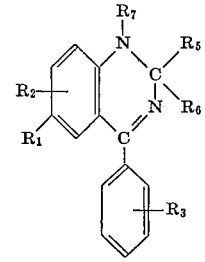

wherein $R_1$ and $R_2$ are each independently selected from the group consisting of hydrogen, halogen, lower alkyl, lower alkoxy, nitro, trifluoromethyl, and cyano; $R_3$ is hydrogen, halogen, lower alkyl, nitro, or trifluoromethyl; $R_5$ is hydrogen, lower alkyl, halo-lower alkyl, di-halo-lower alkyl, tri-halo-lower alkyl, amino-lower alkyl or aza-cyclo-lower alkyl-lower alkyl; $R_6$ is hydrogen, lower alkyl, halo-lower alkyl, di-halo-lower alkyl, tri-halo-lower alkyl, amino-lower alkyl or aza-cyclo-lower alkyl-lower alkyl or when taken together, $R_5$ and $R_6$ are lower alkylene, aza-alkylene or N-lower alkyl-aza-lower alkylene; and $R_7$ is hydrogen, lower alkyl, cyclo-lower alkyl or cyclo-lower alkyl-lower alkyl which comprises treating a 2-aminobenzophenone of the formula:

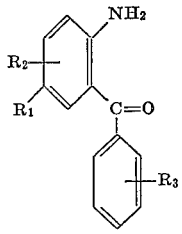

wherein $R_1$, $R_2$ and $R_3$ have the same meaning as above with ammonia or an ammonium salt and a member selected from the group consisting of ketones and aldehydes of the formula:

wherein $R_5$ and $R_6$ have the same meaning as above and acetals of the formula:

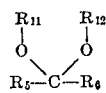

wherein $R_5$ and $R_6$ have the same meaning as above and $R_{11}$ and $R_{12}$ are each independently lower alkyl or benzyl or, taken together, $R_{11}$ and $R_{12}$ are lower alkylene and where $R_7$ is other than hydrogen, alkylating the product of the aforesaid reaction.

13. A process according to claim 12 wherein the reaction is carried out in the presence of acetic acid.

14. A process for the preparation of a compound of the formula:

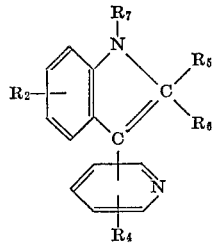

wherein $R_1$ and $R_2$ are each independently selected from the group consisting of hydrogen, halogen, lower alkyl, lower alkoxy, nitro, trifluoromethyl, and cyano; $R_4$ is hydrogen; $R_5$ is hydrogen, lower alkyl, halo-lower alkyl, di-halo-lower alkyl, tri-halo-lower alkyl, amino-lower alkyl, phenyl, phenyl-lower alkyl or aza-cyclo-lower alkyl-lower alkyl; $R_6$ is hydrogen, lower alkyl, halo-lower alkyl, di-halo-lower alkyl, tri-halo-lower alkyl, amino-lower alkyl or aza-cyclo-lower alkyl-lower alkyl, or when taken together, $R_5$ and $R_6$ are lower alkylene, aza-alkylene or N-lower alkyl-aza-lower alkylene; and $R_7$ is hydrogen, lower alkyl, cyclo-lower alkyl or cyclo-lower alkyl-lower alkyl which comprises treating a 2-aminobenzoylpyridine of the formula:

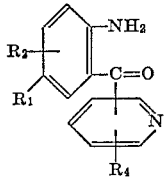

wherein $R_1$, $R_2$ and $R_4$ have the same meaning as above with ammonia or a salt thereof and a member selected from the group consisting of ketones and aldehydes of the formula:

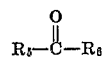

wherein $R_5$ and $R_6$ have the same meaning as above and acetals of the formula:

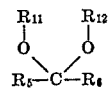

$R_{11}$ and $R_{12}$ are each independently lower alkyl or benzyl wherein $R_5$ and $R_6$ have the same meaning as above and or, taken together, $R_{11}$ and $R_{12}$ are lower alkylene and where $R_7$ is other than hydrogen, alkylating the product of said reaction.

15. A process according to claim 14 wherein the reaction is carried out in the presence of acetic acid.

16. A compound of the formula

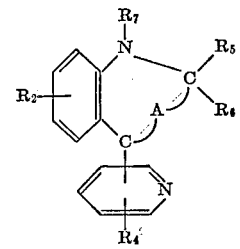

wherein $R_1$ and $R_2$ are each independently selected from the group consisting of hydrogen, halogen, lower alkyl, lower alkoxy, nitro, trifluoromethyl, and cyano; $R_4$ is hydrogen; $R_5$ is hydrogen, lower alkyl, halo-lower alkyl, di-halo-lower alkyl, tri-halo-lower alkyl, amino-lower alkyl or aza-cyclo-lower alkyl- lower alkyl; $R_6$ is hydrogen, lower alkyl, halo-lower alkyl, di-halo-lower alkyl, tri-halo-lower alkyl, amino-lower alkyl or aza-cyclo-lower alkyl-lower alkyl; or when taken together, $R_5$ and $R_6$ are lower alkylene, aza-alkylene or N-lower alkyl-aza-lower alkylene; $R_7$ is hydrogen, lower alkyl, cyclo-lower alkyl or cyclo-lower alkyl-lower alkyl; and A represents the group

or the group

and pharmaceutically acceptable acid addition salts thereof.

17. A compound according to claim 16 wherein A represents the group

i.e., a compound of the formula

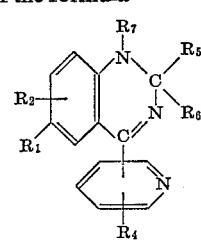

wherein $R_1$ and $R_2$ are each independently selected from the group consisting of hydrogen, halogen, lower alkyl, lower alkoxy, nitro, trifluoromethyl, and cyano; $R_4$ is hydrogen; $R_5$ is hydrogen, lower alkyl, halo-lower alkyl, di-halo-lower alkyl, tri-halo-lower alkyl, amino-lower alkyl or aza cyclo-lower alkyl-lower alkyl; $R_6$ is hydrogen, lower alkyl, halo-lower alkyl, di-halo-lower alkyl, tri-halo-lower alkyl, amino-lower alkyl or aza-cyclo-lower alkyl-lower alkyl; or when taken together, $R_5$ and $R_6$ are lower alkylene, aza-alkylene or N-lower alkyl-aza-lower alkylene; and $R_7$ is hydrogen, lower alkyl, cyclo-lower alkyl or cyclo-lower alkyl-lower alkyl.

18. A compound according to claim 16 wherein A represents the group

i.e., a compound of the formula

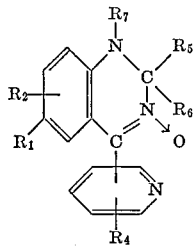

wherein $R_1$ and $R_2$ are each independently selected from the group consisting of hydrogen, halogen, lower alkyl, lower alkoxy, nitro, trifluoromethyl, and cyano; $R_4$ is hydrogen; $R_5$ is hydrogen, lower alkyl, halo-lower alkyl, di-halo-lower alkyl, tri-halo-lower alkyl, amino-lower alkyl or aza cyclo-lower alkyl-lower alkyl; $R_6$ is hydrogen, lower alkyl, halo-lower alkyl, di-halo-lower alkyl, tri-halo-lower alkyl, amino-lower alkyl or aza-cyclo-lower alkyl-lower alkyl; or when taken together, $R_5$ and $R_6$ are lower alkylene, aza-alkylene or N-lower alkyl-aza-lower alkylene; and $R_7$ is hydrogen, lower alkyl, cyclo-lower alkyl or cyclo-lower alkyl-lower alkyl.

19. The compound according to claim 18 wherein $R_1$ and $R_2$ are each bromo and $R_2$ is in 8-position; $R_4$, $R_5$, $R_6$ and $R_7$ are each hydrogen; and the pyridyl moiety is a 2-pyridyl group, i.e., the compound 6,8-dibromo-1,2-dihydro-4(2-pyridyl)quinazoline 3-oxide.

References Cited

UNITED STATES PATENTS 3,398,139    8/1968    Field et al. _____ 260—239

ALEX MAZEL, Primary Examiner

R. V. RUSH, Assistant Examiner

U.S. Cl. X.R.

260—256.4, 256.5, 999, 239; 424—251

UNITED STATES PATENT OFFICE
CERTIFICATE OF CORRECTION

Patent No. 3,515,724     Dated June 2, 1970

Inventor(s) Field and Sternbach

It is certified that error appears in the above-identified patent and that said Letters Patent are hereby corrected as shown below:

Column 14,    claim 10,    lines 5-14

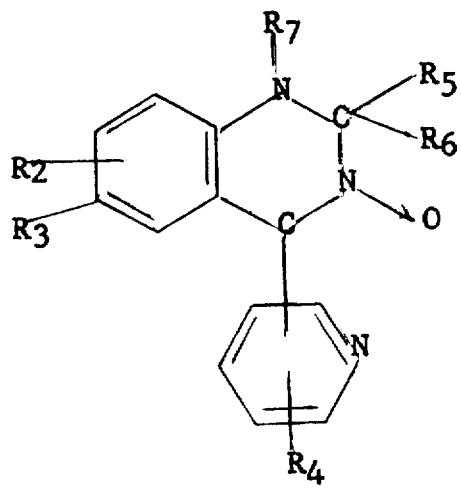 should be 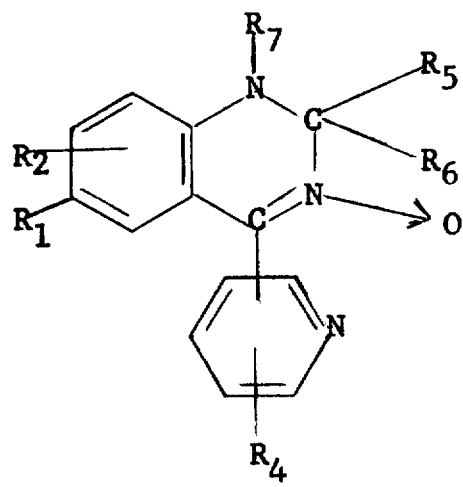

Column 15,    claim 14,    lines 42-50

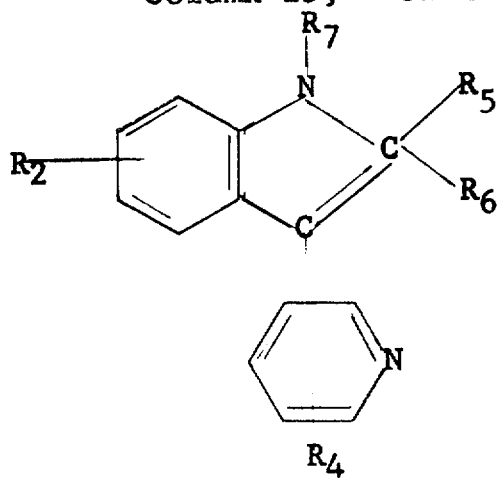 should be 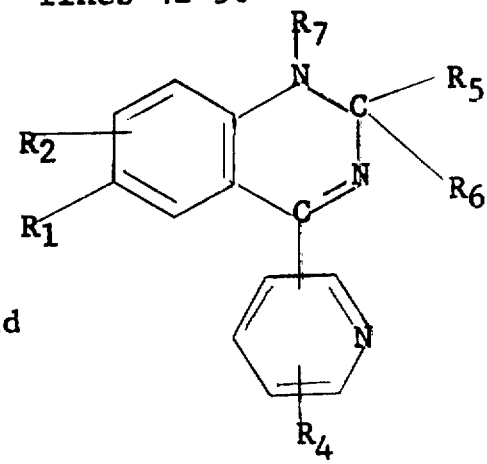

PO-1050
(5/69)

UNITED STATES PATENT OFFICE
CERTIFICATE OF CORRECTION

Patent No. 3,515,724        Dated

Inventor(s)

It is certified that error appears in the above-identified patent and that said Letters Patent are hereby corrected as shown below:

Column 16,   claim 14,   lines 11 and 12

"$R_{11}$ and $R_{12}$ are each independently lower alkyl or benzyl wherein $R_5$ and $R_6$ have the same meaning as above and or"

should be wherein $R_5$ and $R_6$ have the same meaning as above and $R_{11}$ and $R_{12}$ are each independently lower alkyl or benzyl or Column 16,   claim 16,   lines 20-29

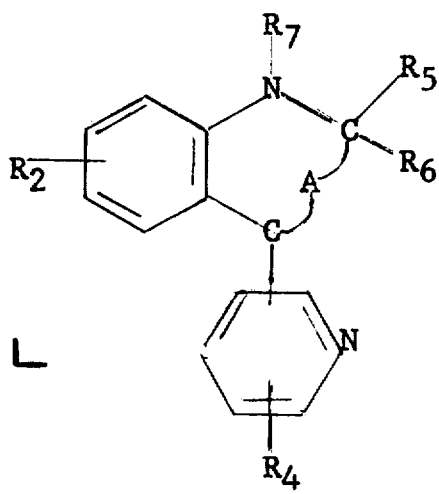 should be 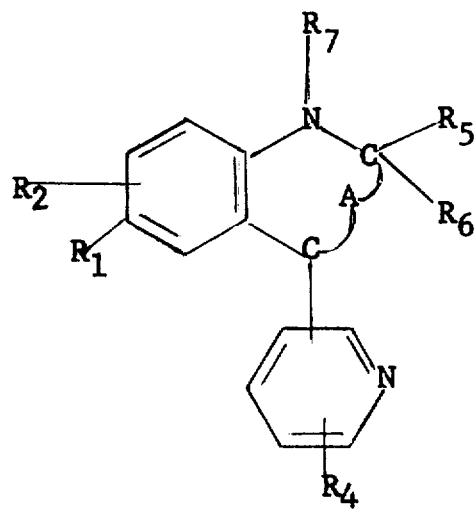

UNITED STATES PATENT OFFICE
CERTIFICATE OF CORRECTION

Patent No. 3,515,724      Dated June 2, 1970

Inventor(s) Field and Sternbach      Page 3

It is certified that error appears in the above-identified patent and that said Letters Patent are hereby corrected as shown below:

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents